US007143220B2

(12) United States Patent
Edirisooriya et al.

(10) Patent No.: US 7,143,220 B2
(45) Date of Patent: Nov. 28, 2006

(54) APPARATUS AND METHOD FOR GRANTING CONCURRENT OWNERSHIP TO SUPPORT HETEROGENEOUS AGENTS IN ON-CHIP BUSSES HAVING DIFFERENT GRANT-TO-VALID LATENCIES

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US); Hang T. Nguyen, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 10/797,771

(22) Filed: Mar. 10, 2004

(65) Prior Publication Data

US 2005/0216632 A1 Sep. 29, 2005

(51) Int. Cl.
*G06F 13/36* (2006.01)
*G06N 7/06* (2006.01)
(52) U.S. Cl. .................. 710/113; 710/107; 710/111; 370/462
(58) Field of Classification Search ........... 710/110, 710/113, 240, 241, 107, 305, 244, 36, 40, 710/58, 112, 111; 370/461, 462; 340/825.5, 340/825.51; 711/147, 100
See application file for complete search history.

(56) References Cited

U.S. PATENT DOCUMENTS 5,253,348 A * 10/1993 Scalise ................ 710/113

6,173,349 B1 * 1/2001 Qureshi et al. ............ 710/110
6,393,506 B1 * 5/2002 Kenny .................. 710/113
6,671,761 B1 * 12/2003 Kim .................... 710/244
2004/0205275 A1 * 10/2004 Bell et al. ............... 710/305

OTHER PUBLICATIONS

"SAMBA-bus: a high performance bus architecture for system-on-chips" by Lu et al. (abstract only) Publication date: Nov. 9-13, 2003.*

* cited by examiner

*Primary Examiner*—Gopal C. Ray
(74) *Attorney, Agent, or Firm*—Blakely, Sokoloff, Taylor & Zafman LLP

(57) ABSTRACT

A method and apparatus for supporting heterogeneous agents in on-chip busses. In one embodiment, the method includes the detection of a bus arbitration event between at least a first bus agent and a second bus agent. In one embodiment, a bus arbitration event is detected when at least the first bus agent and the second bus agent assert their respective bus request signals in a single clock cycle. Once a bus arbitration event is detected, bus ownership may be granted to both the first bus agent and the second bus agent, when the first bus agent and the second bus agent have different grant-to-valid latencies. In the embodiment, heterogeneous bus agents may coexist on a bus without requiring wasted or unused bus cycles following establishment of bus ownership. Other embodiments are described and claimed.

30 Claims, 9 Drawing Sheets

COMPUTER SYSTEM 100

US 7,143,220 B2

APPARATUS AND METHOD FOR GRANTING CONCURRENT OWNERSHIP TO SUPPORT HETEROGENEOUS AGENTS IN ON-CHIP BUSSES HAVING DIFFERENT GRANT-TO-VALID LATENCIES

FIELD OF THE INVENTION

One or more embodiments of the invention relate generally to the field of integrated circuit and computer system design. More particularly, one or more of the embodiments of the invention relates to a method and apparatus for supporting heterogeneous agents in on-chip busses.

BACKGROUND OF THE INVENTION

Communications between devices that make up an electronic system are typically performed using one or more busses that interconnect such devices. These busses may be dedicated busses coupling only two devices, or they may be used to connect more than two devices. The busses may be formed entirely on a single integrated circuit die, thus being able to connect two or more devices on the same chip. Alternatively, a bus may be formed on a separate substrate than the devices, such as on a printed wiring board.

In computer systems employing advanced architectures and processors, bus transactions typically occur in a pipelined manner. Specifically, the next memory access may start after a previous transaction request is issued; and all components or phases of a bus transaction are not required to complete before another bus transaction may be initiated. Accordingly, requests from numerous bus agents may be pending at any one time. Generally, an arbitration scheme is used to aware bus ownership to a bus agent. However, varying grant-to-valid latencies of the various bus agents may result in unused or wasted bus cycle. As a result, the wasted bus cycles may degrade bus bandwidth and access latency.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for supporting heterogeneous agents in on-chip busses are described. In one embodiment, the method includes the detection of a bus arbitration event between at least a first bus agent and a second bus agent. In one embodiment, a bus arbitration event is detected when at least the first bus agent and the second bus agent assert their respective bus request signals in a single clock cycle. Once a bus arbitration event is detected, bus ownership may be granted to both the first bus agent and the second bus agent, when the first bus agent and the second bus agent have different grant-to-valid latencies. In the embodiment, heterogeneous bus agents may coexist on a bus without requiring wasted or unused bus cycles following establishment of bus ownership.

System Architecture

Figure 1:
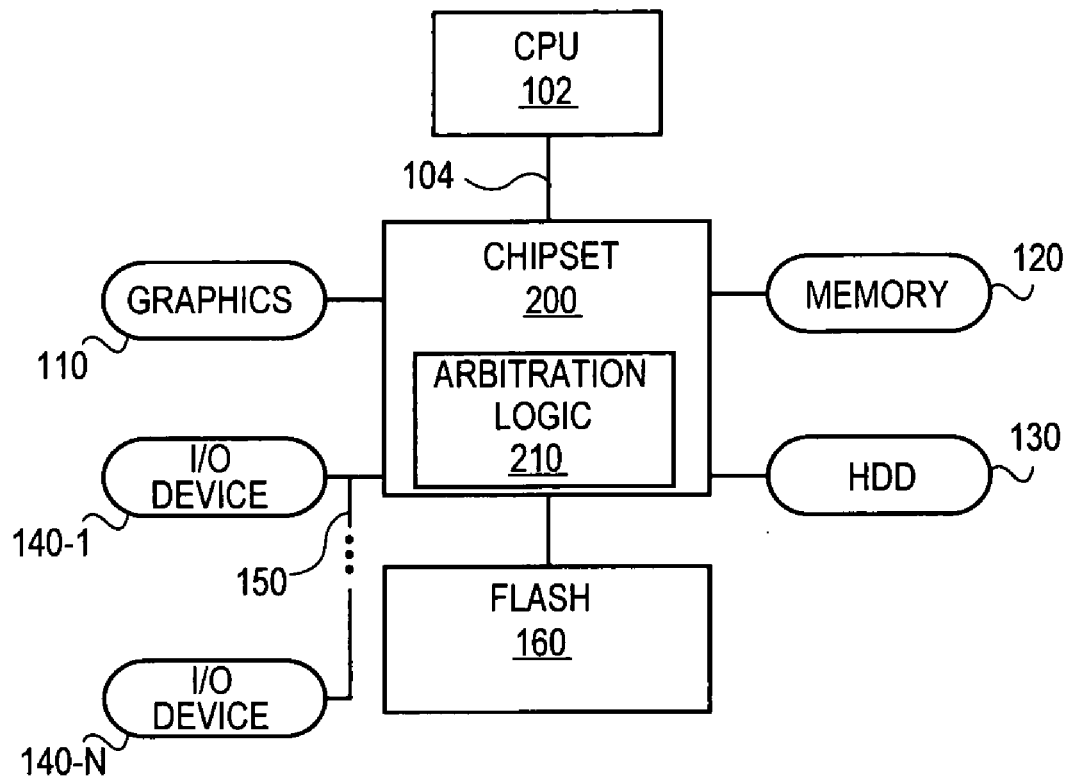
FIG. 1 is a block diagram illustrating a computer system including arbitration logic for supporting heterogeneous bus agents of an on-chip bus, in accordance with one embodiment.

FIG. 1 is a block diagram illustrating computer system 100 including arbitration logic 210 for granting concurrent bus ownership to heterogeneous bus agents, in accordance with one embodiment. In one embodiment, devices having different grant-to-valid latencies are referred to herein as "heterogeneous bus agents", which may be granted concurrent bus ownership to avoid unused or wasted bus cycles. As described herein, a grant-to-valid latency refers to, or is defined as, the number of clock cycles required by a device to place a request on the bus after receiving bus ownership in response to a bus grant signal.

Representatively, computer system 100 comprises a processor system bus (front side bus (FSB)) 104 for communicating information between processor (CPU) 102 and chipset 200. As described herein, the term "chipset" is used in a manner to collectively describe the various devices coupled to CPU 102 to perform desired system functionality. As described herein, each device that resides on FSB 104 is referred to as bus agent of FSB 104. As such, the various agents of computer system 100 are required to arbitrate for access to FSB 102.

Representatively, chipset 200 may include graphics block 110, such as, for example, a graphics chipset, as well as hard drive devices (HDD) 130 and main memory 120. In one embodiment, chipset 200 is configured to include a memory controller and/or an input/output (I/O) controller. In an alternate embodiment, chipset 200 is or may be configured to operated as or include a system controller. In one embodiment, main memory 120 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, a plurality of I/O devices 140 (140-1, . . . , 140-N) may be coupled to chipset 200 via bus 150. As described above, each device that resides on a bus (such as FSB 104 and bus 150) is referred to as a bus agent. In one embodiment, each bus agent arbitrates for bus ownership by asserting a bus request signal. In one embodiment, computer system 100 may be configured according to a three-bus system, including, but not limited to, an address bus, a data bus and a transaction bus. Accordingly, a bus agent issues an address bus request signal (ABR), a data bus request signal (DBR) or a transaction bus request (TBR) signal to request bus ownership.

A bus transaction can exhibit several bus protocol events. These include an arbitration event to determine bus ownership, between competing bus agents. Thereafter, the transaction enters the request phase where the bus owner drives transaction address information. Accordingly, when the request phase includes a data request, the bus agent requesting data may be referred to herein as an "initiator bus agent". Following transaction initiation, a data phase results in a bus agent providing the requested data to the initiator bus agent. As described herein, the bus agent from which data is requested is referred to herein as a "completer bus agent". As further described herein, the completer bus agent may be referred to as a "master bus agent", whereas the initiator bus agent may be referred to as a "target bus agent".

Accordingly, computer systems, such as computer system 100, generally utilize shared bus architectures to provide communication among devices. Devices, such as processors, memory controllers, I/O controllers and direct memory access (DMA) units are usually connected via a shared bus. In general, only one device can drive the bus at a given time. Hence, it is necessary to arbitrate between devices requesting bus ownership to prevent multiple devices from driving the bus simultaneously.

In one embodiment, bus 150 is configured as an on-chip, pipelined bus shared by devices with various grant-to-valid latencies. As a result, bus 150 requires no turnaround cycles, since bus 150 may be implemented as an on-chip bus utilizing a logical OR gate or a multiplexed (MUX) based implementation. In on-chip bus implementations, it is generally is feasible for an agent to place a request on the bus in cycle n+1 if it receives a bus grant from arbitration logic in clock cycle n. In other words, the bus agents of an on-chip bus are assumed to have a single clock cycle a grant-to-valid latency for placing a request on the bus after receiving bus ownership.

Figure 2:
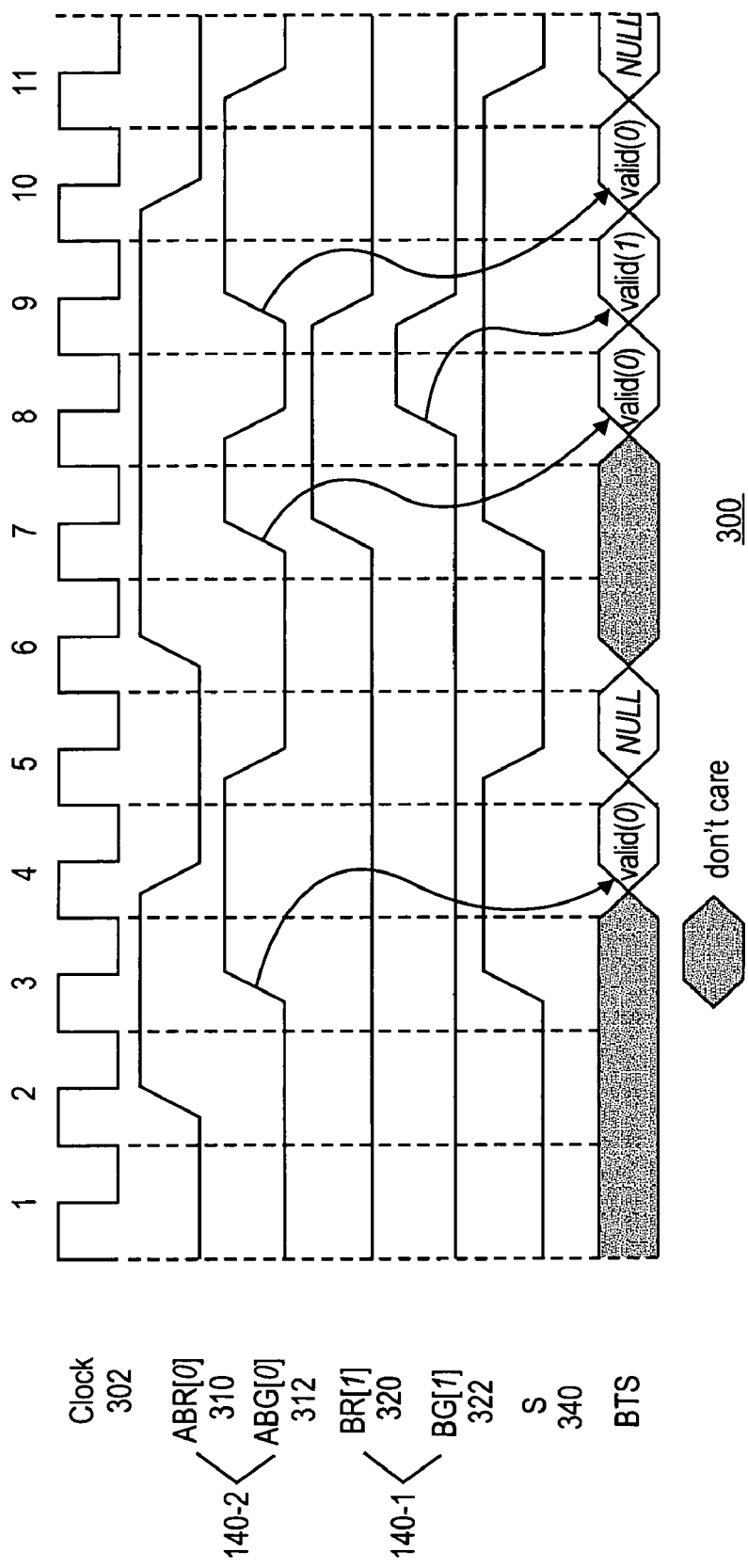
FIG. 2 is a timing diagram illustrating arbitration between non-heterogeneous bus agents, in accordance with one embodiment.

For example, as illustrated with reference to FIG. 2, bus agent 140-2 may assert bus request (BR) signal 310 in clock cycle 2. As described herein, signals associated, or appended, with the pound sign (#) represent active low signals or signals that are driven low when asserted. However, as described herein, the terms "assert", "asserting", "asserted", "assertion", "set(s)", "setting", "deasserted", "deassert", "deasserting", "deassertion" or the like terms may refer to data signals, which are either active low or active high signals. Therefore such terms, when associated with a signal, are interchangeably used to require either active high or active low signals.

In response to assertion of BR signal 310, arbitration logic issues, or asserts, bus grant signal BG 312 in clock cycle 3 and expects bus agent 140-2 to drive data during clock cycle 4, as illustrated. In one embodiment, arbitration logic includes assertion logic (not shown) to assert bus grant signals BG 312 and 322. Generally, arbitration logic 210 can use this fact to efficiently arbitrate an on-chip bus (e.g., bus 150/FSB 104). Accordingly, when the bus agent can place a request on the bus in cycle n+1, following a bus grant from arbitration logic 210 in cycle n, the bus agent is said to have a grant-to-valid latency of one clock cycle.

Conventional arbitration logic is designed according to a fixed grant-to-valid, such as one clock cycle. Accordingly, conventional design of arbitration logic requires that each bus agent have a fixed grant-to-valid latency, referred to herein as a "fast bus agent". As a result, slow bus agents are required to be coupled to a separate bus. As described herein, a "slow bus agent" refers to a bus agent having a grant-to-valid latency that exceeds the fixed grant-to-valid latency of fast bus agents. Therefore, when a slow bus agent is coupled to a bus, including fast bus agents, unused or wasted bus cycles may be caused by inclusion of the slow bus agent.

Referring again to FIG. 2, in one embodiment, arbitration logic 210 allows heterogeneous bus agents with various grant-to-valid latencies (fast/slow bus agents) to connect to a shared bus. Hence, fast/slow bus agents are permitted to request and use a shared bus without wasting any bus cycles due to different grant-to-valid latencies. In one embodiment, bus arbitration for such heterogeneous bus agents is built into arbitration logic 210 rather than the various bus agents. Hence, bus agents can be designed independently without any knowledge of the grant-to-valid latencies of other agents connected to the shared bus. In one embodiment, arbitration logic 210 uses the various grant-to-valid latencies of the different bus agents coupled to an on-chip bus, (e.g., FSB 102 and bus 150) to grant bus ownership without wasting bus cycles due to slow bus agents using bus grant logic (not shown).

Figure 3:
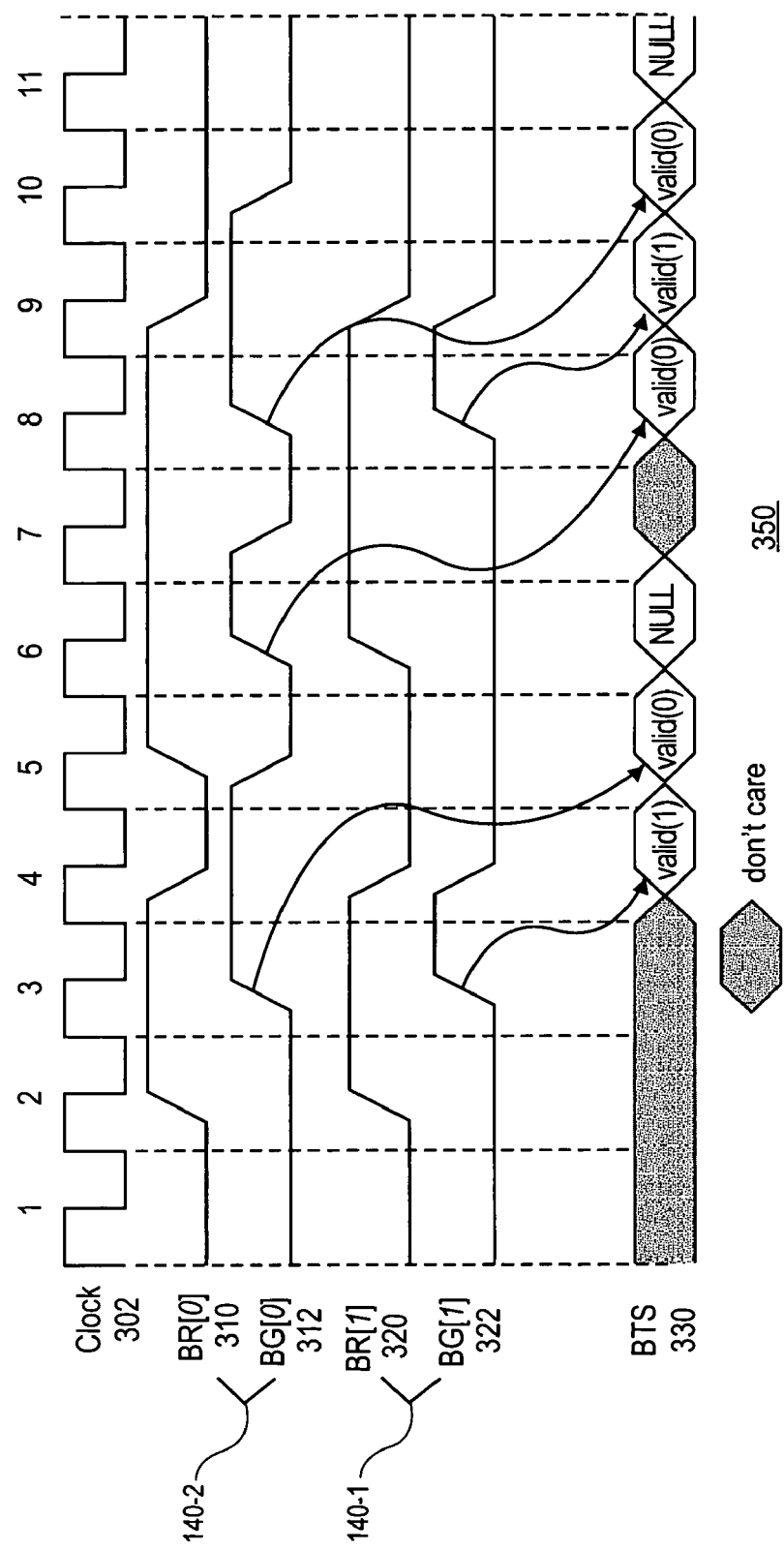
FIG. 3 is a timing diagram illustrating granting of bus ownership to non-heterogeneous bus agents, in accordance with one embodiment.

Referring to FIG. 3, in one embodiment, bus agent 140-1 is designed with a single clock cycle grant-to-valid latency (fast bus agent). Conversely, bus agent 140-2 is slow bus agent, designed with a two-clock grant-to-valid latency. Representatively, when fast bus agent 140-1 and slow bus agent 140-2 assert BR signals 310 and 320 in clock cycle 2, arbitration logic 210 detects a bus arbitration event between fast bus agent 140-1 and slow bus agent 140-2. According to conventional arbitration, assuming that bus agent 140-1 or 140-2 are both symmetric agents, granting of bus ownership is generally limited to a single bus agent by performing some arbitration algorithm for awarding bus ownership to either bus agent 140-1 or bus agent 140-2.

Accordingly, as illustrated in FIG. 3, it is possible to have a fast bus agent 140-1 and a slow device 140-2 on the same bus, without causing unused bus cycles. As illustrated, arbitration logic 210 treats fast and slow bus agents differently and generates bus grants accordingly to avoid wasting bus cycles due to slow bus agents. When responding to a bus request generated by fast bus agent 140-1, the arbitration logic 210 asserts BG signal 322 and expects fast bus agent 140-1 to use the bus in the following clock cycle. Conversely, when arbitration logic 210 grants bus ownership to slow bus agent 140-2, arbitration logic expects slow bus agent 140-2 to use the bus two clock cycles from the assertion of BG signal 312.

In one embodiment, arbitration logic 210 may compare grant-to-valid latencies of bus agent 140-1 and 140-2 using bus grant logic (not shown). When the grant-to-valid latencies of the respective bus agents do not match, in clock cycle 3, arbitration logic 210 may issue a bus grant signal to both fast bus agent 140-1 and slow bus agent 140-2. Representatively, fast bus agent 140-1 drives data during clock cycle 4. Conversely, slow bus agent 140-2 drives data in clock cycle 5. In other words, slow bus agent 140-2 cannot use the bus cycle following the assertion of BG signal 312. Bus agent 140-2 will drive the bus two cycles after detecting assertion of BG signal 310.

As illustrated, arbitration logic 210 grants bus ownership, or concurrent bus ownership, to both fast bus agent 140-1 and slow bus agent 140-2 in clock cycle 8 by simultaneously asserting B6 signal 312 and B6 signal 322. Representatively, fast bus agent 140-1 drives the bus in clock cycle 9 and slow bus agent 140-2 drives the bus in clock cycle 10. Accordingly, bus cycles are not wasted when supporting heterogeneous bus agents (bus agents which have non-matching grant-to-valid latencies). As illustrated, when a bus agent has no operation to perform on the bus while having bus ownership, the bus agent may generate null bus cycles, as illustrated in clock cycles 6 and 11.

Figure 4:
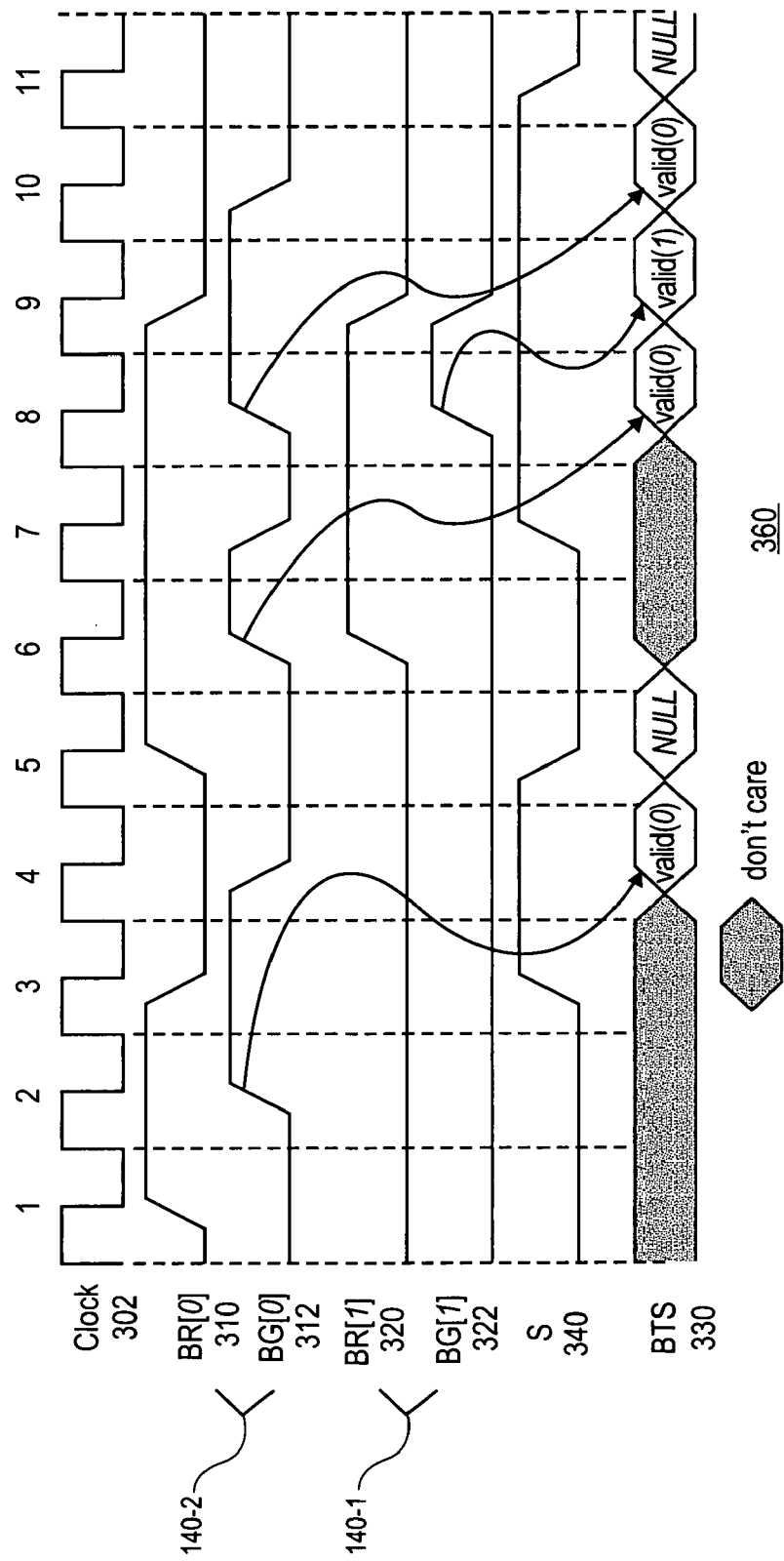
FIG. 4 is a timing diagram further illustrating granting of bus ownership to heterogeneous bus agents, in accordance with one embodiment.

Accordingly, as illustrated in FIG. 4, following assertion of BR signal 310 in clock cycle 1, arbitration logic 210 grants bus ownership to slow bus agent 140-2 in clock cycle 2 by asserting BG signal 312. However, due to the two-clock cycle grant-to-valid latency of slow bus agent 140-2, slow bus agent 140-2 drives data at clock cycle 4 rather than clock cycle 3. As further illustrated, a bus agent that retains bus ownership, but does not include valid data to place on the bus, may place null data on the bus (e.g., clock cycle 6).

Representatively, in clock cycle 5, slow bus agent 140-2 may once again request bus ownership by driving BR signal 310. During clock cycle 6, arbitration logic 210 grants slow bus agent 140-2 bus ownership by asserting BG signal 312. However, also during clock cycle 6, fast bus agent 140-1, which includes a single bus cycle grant-to-valid latency, may request bus ownership by driving BR signal 320. As illustrated, bus agent 140-1 may be immediately granted bus ownership in clock cycle 8, while bus agent 140-2 drives data in clock cycle 8. As such, bus agent 140-1 may drive data during bus cycle 9 following granting of bus ownership in bus cycle 8.

Figure 5:
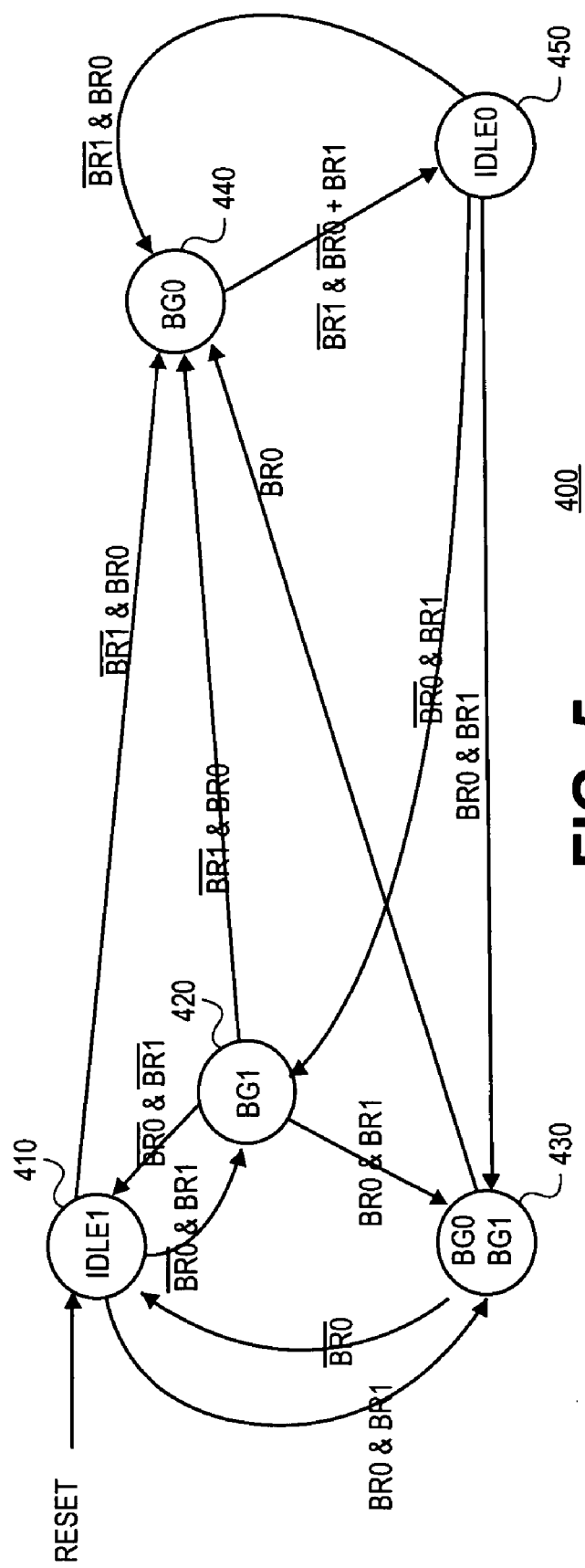
FIG. 5 is a block diagram illustrating a state machine for round-robin arbitration between heterogeneous bus agents, in accordance with one embodiment.

Accordingly, bus agents may simultaneously assert their respective bus request signal, resulting in a bus arbitration event. As illustrated with reference to FIG. 5, state machine 400 determines the assertion of BG signals between fast agent 140-1 and slow agent 140-2, assuming a round-robin arbitration algorithm. Although the embodiment is illustrated with reference to a fast agent and a slow agent, those skilled in the art will recognize that embodiments described herein may be adapted to multiple bus agents, which have various grant-to-valid latencies. Procedural methods for implementing one or more embodiments are now described.

Operation

Figure 6:
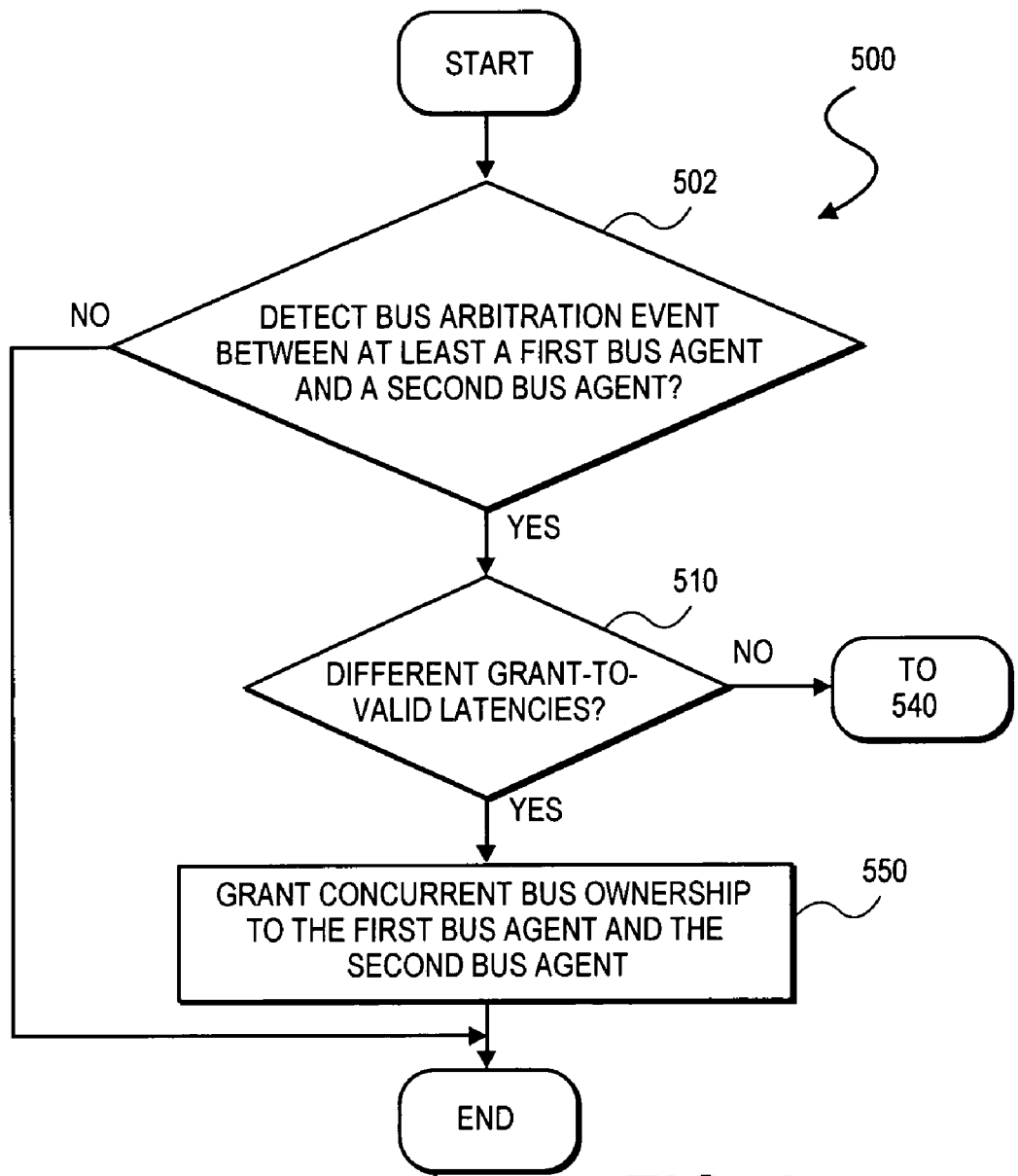
FIG. 6 is a flowchart illustrating a method for granting concurrent bus ownership to heterogeneous bus agents, in accordance with one embodiment.

FIG. 6 is a flowchart illustrating a method 500 for granting concurrent bus ownership to heterogeneous bus agents, in accordance with one embodiment. As described herein, heterogeneous bus agents refer to bus agents having different grant-to-valid latencies. As also described herein, a grant-to-valid latency is defined as the number of clock cycles required by a device or bus agent to place a request on the bus after receiving bus ownership by assertion of a bus grant signal. Accordingly, by granting heterogeneous bus agents concurrent bus ownership, non-heterogeneous bus agents may be bus agents of the same bus and can inter-operate seamlessly without wasting any bus cycles.

Referring again to FIG. 6, at process block 502, a bus arbitration event is detected between at least a first bus agent and a second bus agent. In one embodiment, a bus arbitration event is detected when a first bus agent's request signal and a second bus agent's request signal are asserted during a single clock cycle. At process block 510, it is determined whether the first bus agent and the second bus agent have different grant-to-valid latencies. When such is the case, the first bus agent and the second bus agent are identified as heterogeneous bus agents.

Accordingly, at process block 550, concurrent bus ownership is granted to the first bus agent and the second bus agent. Although bus agents are generally not allowed to simultaneously drive a bus, the first and second bus agents will receive concurrent bus ownership. However, due to the different grant-to-valid latencies of the first and second bus agents, the first bus agent, which may be, for example, a fast bus agent drives the bus prior to the slow bus and completes driving of the bus prior to granting of the bus to a slow bus agent. As a result, concurrent bus ownership may be granted to fast and slow bus agents without causing simultaneous driving of the bus.

Figure 7:
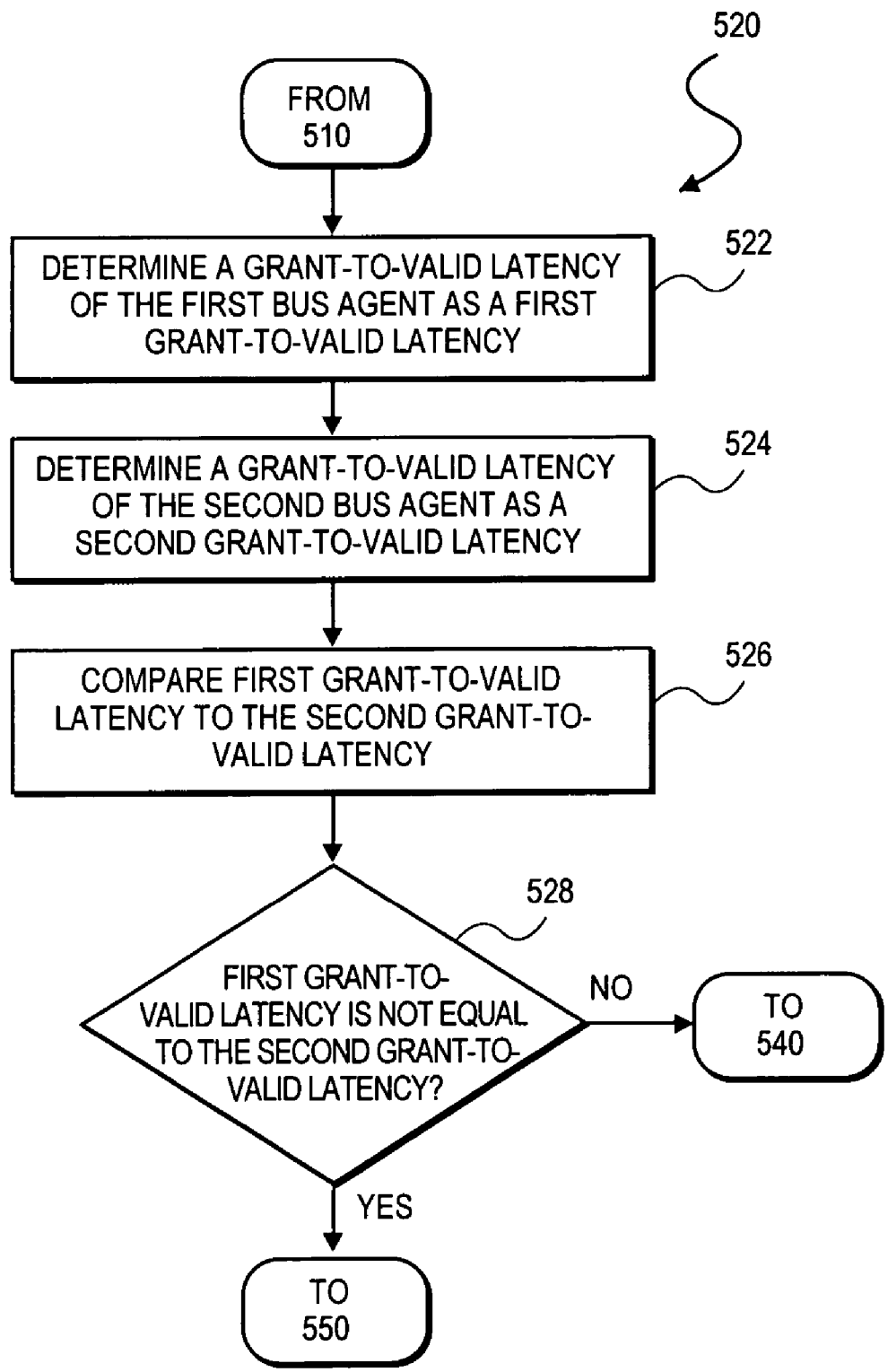
FIG. 7 is a flowchart illustrating a method for identifying heterogeneous bus agents having different grant-to-valid latencies, in accordance with one embodiment.

FIG. 7 is a flowchart illustrating a method 520 for identifying heterogeneous bus agents, in accordance with one embodiment. At process block 522, a grant-to-valid latency of the first bus agent is determined as a first grant-to-valid latency. At process block 524, a grant-to-valid latency of the second bus agent is determined as a second grant-to-valid latency. At process block 526, the first grant-to-valid latency is compared to the second grant-to-valid latency. At process block 528, control flow branches to process block 540 if the first grant-to-valid latency is equal to the second grant-to-valid latency.

However, if the first grant-to-valid latency is not equal to the second grant-to-valid latency, control flow branches to process block 550 of FIG. 6, wherein concurrent bus ownership is granted. In one embodiment, granting of concurrent bus ownership is performed by asserting a bus grant signal, or simultaneously asserting a bus grant signal, to both the first bus agent and the second bus agent during a single clock cycle. In the embodiments described, arbitration and concurrent bus ownership includes, but is not limited to, address busses, data busses, transaction busses or other like busses.

Figure 8:
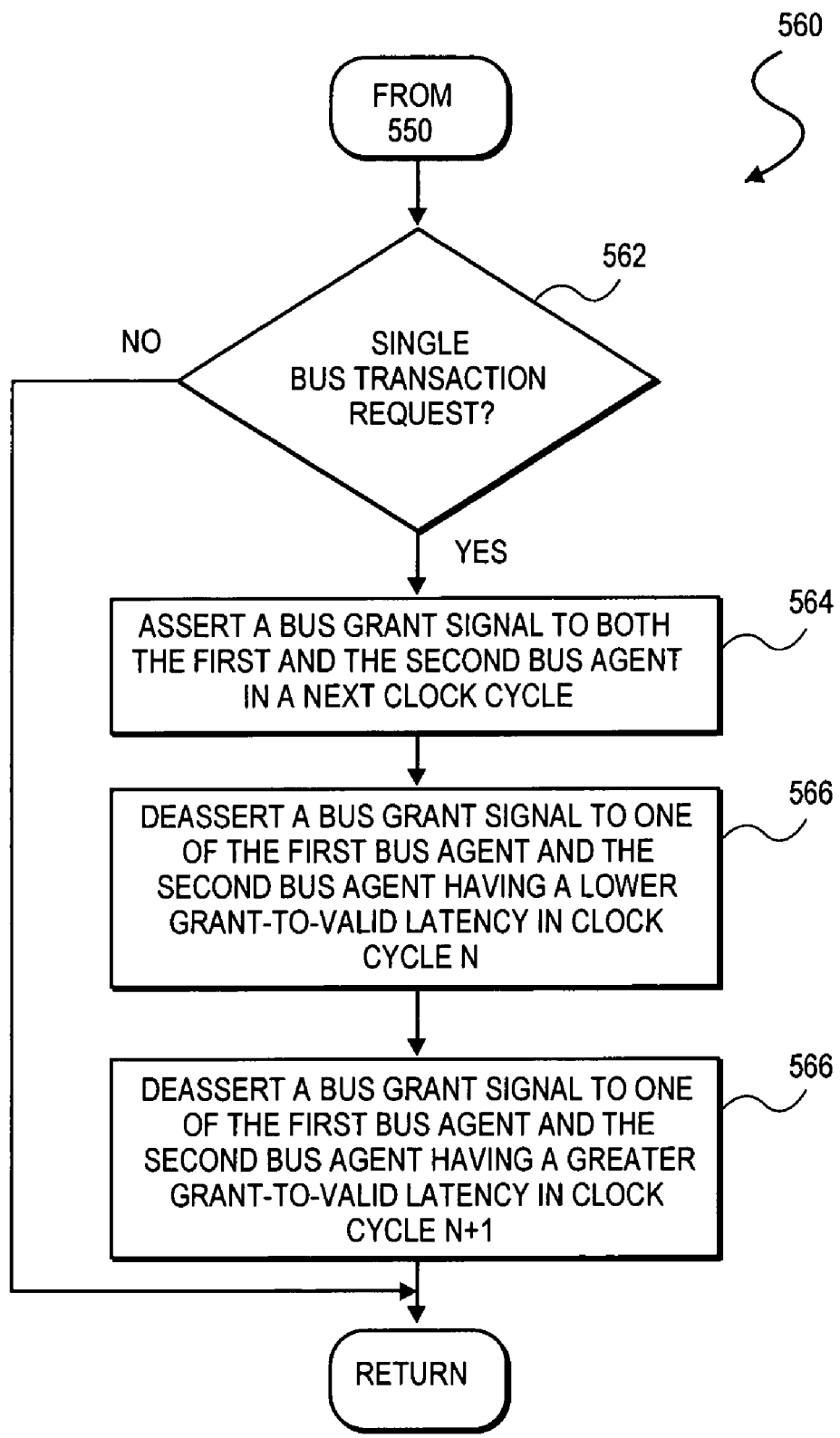
FIG. 8 is a flowchart illustrating a method for granting concurrent bus ownership to heterogeneous bus agents, in accordance with one embodiment.

FIG. 8 is a flowchart illustrating a method 560 for granting concurrent bus ownership, in accordance with one embodiment. At process block 562, it is determined whether the first bus agent and the second bus agent desire a single bus transaction. At process block 564, a bus grant signal is asserted to both the first bus agent and the second bus agent in a next clock cycle. At process block 566, a bus grant signal to one of the first bus agent and the second bus agent having a lower grant-to-valid latency is deasserted in clock cycle n. Likewise, at process block 566, a bus grant signal to one of the first bus agent and the second bus agent having a greater grant-to-valid latency is deasserted in clock cycle n+1. Representatively, unused bus cycles are avoided by analyzing the grant-to-valid latencies of the first and second bus agents by, for example, arbitration logic 210 of FIG. 1, in accordance with one embodiment.

Figure 9:
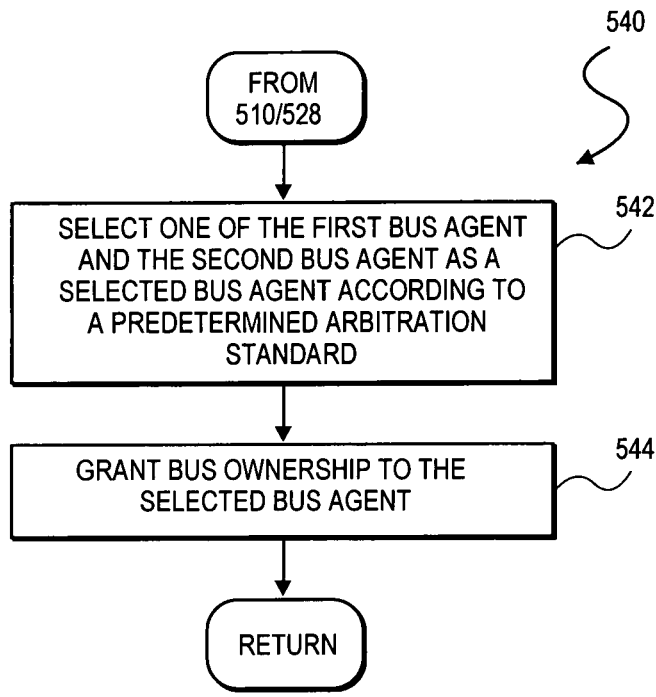
FIG. 9 is a flowchart for granting bus ownership to non-heterogeneous bus agents, in accordance with one embodiment.

FIG. 9 is a flowchart illustrating a method 540 for non-heterogeneous bus agents. As illustrated at process block 542, one of the first bus agent and the second bus agent is selected according to a predetermined arbitration standard or algorithm. For example, in one embodiment, a round-robin arbitration algorithm or other like arbitration algorithm may be used to grant bus ownership when a bus arbitration event is detected between a first and second bus agent. In one embodiment, the first and second bus agents are assumed to be symmetric bus agents, which do not have priority over one another. However, in situations where one of the first or second bus agent is a priority agent, the priority agent is granted bus ownership over any non-priority bus agents. Accordingly, at process block 544, bus ownership is granted to the selected bus agent.

Figure 10:
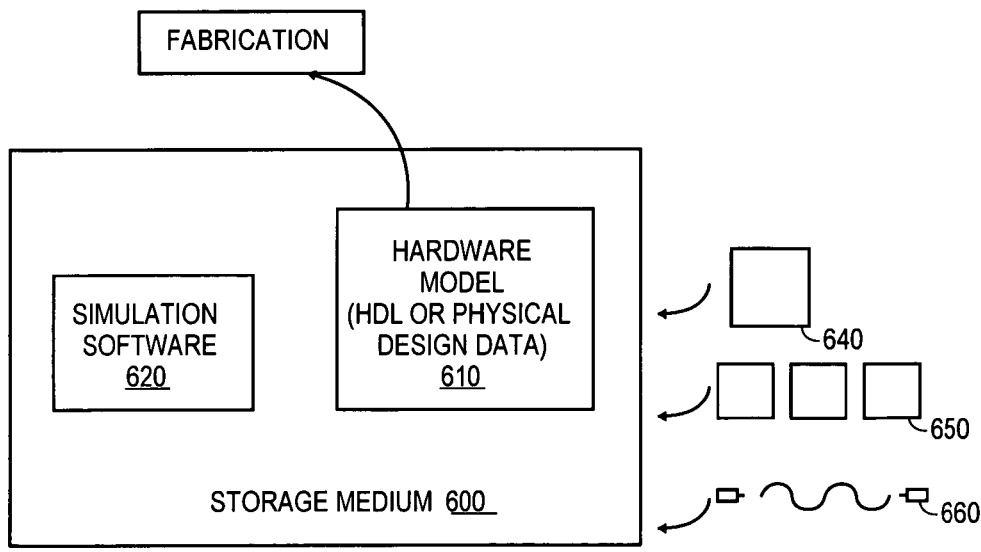
FIG. 10 is a block diagram illustrating various design representations or formats for simulation, emulation and fabrication of a design using the disclosed techniques.

FIG. 10 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 610 may be stored in a storage medium 600, such as a computer memory, so that the model may be simulated using simulation software 620 that applies a particular test suite 630 to the hardware model to determine if it indeed functions as intended. In some embodiments, the simulation software is not recorded, captured or contained in the medium.

In any representation of the design, the data may be stored in any form of a machine readable medium. An optical or electrical wave 660 modulated or otherwise generated to transport such information, a memory 650 or a magnetic or optical storage 640, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

It will be appreciated that, for other embodiments, a different system configuration may be used. For example, while the system 100 includes a single CPU 102, for other embodiments, a multiprocessor system (where one or more processors may be similar in configuration and operation to the CPU 102 described above) may benefit from the concurrent bus ownership by bus agent with different grant-to-valid of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
    detecting a bus arbitration event between at least a first bus agent and a second bus agent; and
    granting concurrent bus ownership to the first bus agent and the second bus agent if the first bus agent and the second bus agent have different grant-to-valid latencies.

2. The method of claim 1, wherein detecting the bus arbitration event comprises:
    detecting assertion of at least a first bus request signal and a second bus request signal during a single clock cycle.

3. The method of claim 1, wherein prior to granting concurrent bus ownership, the method further comprises:
    determining a grant-to-valid latency of the first bus agent as a first grant-to-valid latency;
    determining a grant-to-valid latency of the second bus agent as a second grant-to-valid latency; and
    comparing the first grant-to-valid latency to the second grant-to-valid latency to determine whether the first grant-to-valid latency is equal to the second grant-to-valid latency.

4. The method of claim 2, wherein the first bus request signal and the second bus request signal are one of an address bus request signal and a data bus request signal.

5. The method of claim 1, wherein granting concurrent bus ownership comprises:
    asserting a bus grant signal to both the first bus agent and the second bus agent in a next clock cycle.

6. The method of claim 5, wherein the bus grant signal is one of an address bus grant signal and a data bus grant signal.

7. The method of claim 1, further comprising:
    selecting one of the first bus agent and the second bus agent as a selected bus agent according to a predetermined arbitration standard if a grant-to-valid latency of the first bus agent is equal to a grant-to-valid latency of the second bus agent; and
    granting bus ownership to the selected bus agent.

8. The method of claim 1, wherein the predetermined arbitration standard is a round-robin arbitration scheme.

9. The method of claim 1, further comprising:
    deasserting a bus grant signal to one of the first bus agent and the second bus agent having a lower grant-to-valid latency in clock cycle n, where n is an integer greater than one (1); and
    deasserting a bus grant signal to one of the first bus agent and the second bus agent having a greater grant-to-valid latency in clock cycle n+1.

10. The method of claim 1, wherein the first bus agent and the second bus agent are symmetric bus agents.

11. A bus arbiter comprising:
    a controller to detect a bus arbitration event between at least a first bus agent and a second bus agent, the controller to grant concurrent bus ownership to the first bus agent and a second bus agent if the first bus agent and the second bus agent have unequal grant-to-valid latencies.

12. The bus arbiter of claim 11, wherein the controller comprises:
    arbitration logic to determine a grant-to-valid latency of the first bus agent as a first grant-to-valid latency, to determine a grant-to-valid latency of the second bus agent as a second grant-to-valid latency and to compare the first grant-to-valid latency to the second grant-to-valid latency to determine whether the first grant-to-valid latency is equal to the second grant-to-valid latency.

13. The bus arbiter of claim 11, wherein the controller comprises:
    arbitration logic to detect assertion of at least a first bus request signal and a second bus request signal during a single clock cycle.

14. The bus arbiter of claim 11, wherein the first bus request signal and the second bus request signal are one of an address bus request signal and a data bus request signal.

15. The bus arbiter of claim 11, wherein the controller comprises:
    assertion logic to assert a bus grant signal to both the first bus agent and the second bus agent in a next clock cycle.

16. The bus arbiter of claim 15, wherein the bus grant signal is one of an address bus grant signal and a data bus grant signal.

17. The bus arbiter of claim 11, wherein the controller comprises:
    assertion logic to deassert a bus grant signal to one of the first bus agent and the second bus agent having a lower grant-to-valid latency in clock cycle n and to deassert a bus grant signal to one of the first bus agent and the second bus agent having a greater grant-to-valid latency in clock cycle n+1, where n is an integer greater than one (1).

18. The bus arbiter of claim 11, wherein the bus arbiter is an input/output (I/O) controller.

19. The bus arbiter of claim 11, wherein the bus arbiter is a memory controller.

20. The bus arbiter of claim 11, wherein the bus arbiter is a system controller.

21. A system, comprising:
   a bus;
   at least a first bus agent and a second bus agent coupled to the bus; and
   a chipset coupled to the bus including a controller coupled to a bus interface of the chipset, the controller to detect a bus arbitration event between at least the first bus agent and the second bus agent and to grant concurrent bus ownership to the first bus agent and the second bus agent if the first bus agent and a second bus agent have different grant-to-valid latencies.

22. The system of claim 21, wherein the controller comprises:
   arbitration logic to assert a bus grant signal to both the first bus agent and the second bus agent in a next clock cycle n; and
   wherein the arbitration logic is to deassert a bus grant signal to one of the first bus agent and the second bus agent having a lower grant-to-valid latency in clock cycle n+1 and to deassert a bus grant signal to one of the first bus agent and the second bus agent having a greater grant-to-valid latency in clock cycle n+2, where n is an integer greater than one (1).

23. The system of claim 21, wherein the bus is an on-chip, pipelined shared bus.

24. The system of claim 21, wherein the chip set comprises a memory controller and an input/output (I/O) controller.

25. The system of claim 21, wherein the chipset comprises a system controller.

26. An article comprising a machine readable carrier medium carrying data which, when located into a computer system memory in conjunction with simulation routines, provides functionality of a model comprising:
   a controller to detect a bus arbitration event between at least a first bus agent and a second bus agent, the controller to grant concurrent bus ownership to the first bus agent and a second bus agent when the first bus agent and the second bus agent have unequal grant-to-valid latencies.

27. The article of claim 26, wherein the controller comprises:
   arbitration logic to assert a bus grant signal to both the first bus agent and the second bus agent in a next clock cycle n, where n is an integer greater than one (1); and
   wherein the arbitration logic is to deassert a bus grant signal to one of the first bus agent and the second bus agent having a lower grant-to-valid latency in clock cycle n+1 and to deassert a bus grant signal to one of the first bus agent and the second bus agent having a greater grant-to-valid latency in clock cycle n+2.

28. The article of claim 26, wherein the controller is an input/output (I/O) controller.

29. The article of claim 26, wherein the controller is a memory controller.

30. The article of claim 26, wherein the controller is a system controller.

* * * * *

UNITED STATES PATENT AND TRADEMARK OFFICE
CERTIFICATE OF CORRECTION

PATENT NO. : 7,143,220 B2  Page 1 of 1
APPLICATION NO. : 10/797771
DATED : November 28, 2006
INVENTOR(S) : Samantha J. Edirisooriya et al.

It is certified that error appears in the above-identified patent and that said Letters Patent is hereby corrected as shown below:

Column 2, Line 56   Delete "operated" and insert -- operate --
Column 3, Line 36   Delete "is" after "it"

Signed and Sealed this

Seventeenth Day of June, 2008

JON W. DUDAS
*Director of the United States Patent and Trademark Office*